United States Patent [19]

Engel

[11] Patent Number: 4,957,325

[45] Date of Patent: Sep. 18, 1990

[54] AERODYNAMICALLY ENHANCED AIR GRILL

[76] Inventor: Thomas H. Engel, Rte. 1, Box 339B, Springhill, La. 71075

[21] Appl. No.: 359,869

[22] Filed: May 31, 1989

Related U.S. Application Data

[63] Continuation-in-part of Ser. No. 140,475, Jan. 4, 1988, Pat. No. 4,840,442.

[51] Int. Cl.$^5$ .............................................. B62D 35/00
[52] U.S. Cl. ................................ 296/180.2; 296/180.3
[58] Field of Search ................... 296/180.2, 180.3 X, 296/180.5, 180.1, 180.4

[56] References Cited

U.S. PATENT DOCUMENTS

| | | | |
|---|---|---|---|
| 660,046 | 10/1900 | Clarke | 98/6 |
| 3,053,224 | 9/1962 | Pierce | 296/24 C |
| 3,239,267 | 3/1966 | Reynolds | 296/1 |
| 3,385,198 | 5/1968 | Farr | 98/121.1 |
| 3,415,566 | 12/1968 | Kerrigan | 296/1 S |
| 3,516,707 | 6/1970 | Wilfert | 296/1 S |
| 3,695,673 | 10/1972 | Meadows | 296/1 S |
| 3,697,120 | 10/1972 | Saunders | 296/1 S |
| 3,797,879 | 3/1974 | Edwards | 296/1 S |
| 3,815,948 | 6/1974 | Alford | 296/1 S |
| 3,836,191 | 9/1974 | Gotz | 296/1 S |
| 3,892,438 | 7/1975 | John | 296/1 S |
| 3,947,065 | 3/1976 | Geiger | 296/1 S |
| 3,977,716 | 8/1976 | Whited | 296/1 S |
| 4,103,957 | 8/1978 | Landry et al. | 296/1 S |
| 4,545,294 | 10/1985 | Dayus | 98/121.1 |

FOREIGN PATENT DOCUMENTS

| | | | |
|---|---|---|---|
| 1281065 | 2/1961 | France | 296/1 S |
| 1336673 | 3/1962 | France | 296/1 S |

Primary Examiner—Robert R. Song
Attorney, Agent, or Firm—Bill D. McCarthy

[57] ABSTRACT

An aerodynamically enhanced air grill mounted on a vehicle is provided which comprises an air intake grill and a pair of air discharge grills. The air intake grill, and each of the air discharge grills, are provided with an array of substantially vertically, spatially disposed air foils for directing air flow therethrough. Each of the air foils constituting the array of air foils is provided with a cross sectional configuration substantially corresponding to an air foil section. An interior, substantially V-shaped, deflector barrier can be disposed directly behind the air intake grill so as to extend rearwardly with opposite ends of the deflector barrier attached to the grill frame rearwardly of the air discharge grills.

18 Claims, 2 Drawing Sheets

AERODYNAMICALLY ENHANCED AIR GRILL

CROSS REFERENCE TO RELATED APPLICATION

This application is a continuation-in-part of Patent Application U.S. Ser. No. 140,475, entitled "TRAILER AIR GRILL", filed Jan. 4, 1988, now U.S. Pat. No. 4,840,442.

BACKGROUND OF THE INVENTION

1. Field of the Invention

The present invention relates generally to air deflectors, and more particularly but not by way of limitation, to an aerodynamically enhanced air grill mountable on a vehicle for improving stability and reducing wind resistance of the vehicle.

2. Brief Description of the Prior Art

Many different types of air deflectors have been proposed by the prior art for use with large highway tractor-trailer rigs in order to reduce air flow drag and improve fuel mileage. Typical prior art air deflectors are described in Meadows (U.S. Pat. No. 3,695,673), Geiger (U.S. Pat. No. 3,947,065), Edwards (U.S. Pat. No. 3,797,879), Landry et. al. (U.S. Pat. No. 4,103,957), Saunders (U.S. Pat. No. 3,697,120) and Kerrigan (U.S. Pat. No. 3,415,566). While each of the before stated references discloses various types of air deflectors, such air deflectors do not act as a grill for receiving and discharging air flow in order to improve vehicle stability.

Other prior art references (such as John, U.S. Pat. No. 3,892,438) disclose the use of air channeling ducts mounted in the body of campers or trailers to provide air flow from high pressure areas to low pressure areas of the vehicle; whereas Geotz (U.S. Pat. No. 3,836,191) discloses air guide channels that extend from the front end wall of a truck cab to the side walls of the cab. Other references, such as Alfred (U.S. Pat. No. 3,815,948) and Reynolds (U.S. Pat. No. 3,239,267), disclose deflector wall and wind diverter awnings for use with travel trailers.

In addition to the before described prior art, Clark (U.S. Pat. No. 660,046) describes a ventilator for railroad cars; whereas Pierce (U.S. Pat. No. 3,053,224) discloses a horse trailer equipped with a ventilation opening on its forward wall and Farr (U.S. Pat. No. 3,385,198) discloses the use of closely spaced stream lined vanes in an air ingesting grill to prevent the intrusion of foreign objects.

Other prior art references which relate generally to air diverters and ducting, wind drag reducers, air deflectors, or components therefor are Wilfert (U.S. Pat. No. 3,516,707), Whited (U.S. Pat. No. 3,977,716), Dayus (U.S. Pat. No. 4,545,294), and French Pat. Nos. 1,281,065 and 1,336,673.

It is apparent from the above that the prior art is replete with air deflecting devices. However, problems have remained in the design and construction of air deflectors which would enhance not only the performance of the vehicle, but would also enhance the stability of the vehicle without extensive modification or complex components being required in the modification of such vehicles.

The trailer air grill described in my co-pending application, Ser. No. 140,475, now U.S. Pat. No. 4,840,422, overcomes many of the disadvantages of the prior art air deflectors in that such trailer air grill is provided with a unique structure which progressively deflects impacting air to the sides of the trailer during movement thereof. This not only improves the stability of the trailer, but also substantially reduces the likelihood of fishtailing of the trailer. In addition, the unique design of such trailer air grill provides improved fuel mileage for the vehicle pulling the trailer.

The trailer air grill disclosed in my beforementioned co-pending application is constructed for mounting in the front wall and side walls of a trailer. The trailer air grill is provided with a front intake air grill having vertical stationary louvers which are angled to direct air flow toward a side wall discharge air grills mounted in the side walls of the trailers. An interior V-shaped deflector barrier is disposed directly behind the front intake air grill and extends rearwardly with the opposite ends of the deflector barrier attached to the interior side walls of the trailer rearwardly of the side wall air discharge grills. The deflector barrier thus enhances the deflection of the air flow at an angle and toward the side wall air discharge grills when air impacting the front wall intake air grill is received therethrough.

While the trailer air grill disclosed in my copending application represents an advance in the state of the art relating to air grills, new and improved air grills are desired which are more readily adapted to mount on a vehicle. Further, the need still remains for improvements in the aerodynamics of the air grill, and thus the stability and reduction to wind resistance of the vehicle. It is to such an aerodynamically enhanced air grill that the present invention is directed.

SUMMARY OF THE INVENTION

According to the present invention an aerodynamically enhanced air grill is provided which is mounted on an upper, forward portion of a vehicle. Broadly, the aerodynamically enhanced air grill comprises an air intake grill mounted in a forwardly extending portion of a grill frame, and a pair of air discharge grills mounted in spatially disposed side portions of the grill frame. The air intake grill is provided with an array of substantially vertically, spatially disposed air foils for directing air flow toward the air discharge grills when air impacting the air intake grill is received therethrough. Similarly, each of the air discharge grills is provided with an array of substantially vertically, spatially disposed air foils which are adapted to deflect air passing therethrough rearwardly around an adjacently disposed side of the vehicle.

Each of the air foils constituting the array of air foils of the air intake grill and the air discharge grills is provided with a cross sectional configuration substantially corresponding to an air foil section; and the combination of the placement and configuration of the air foils constituting each of the array of air foils provide for aerodynamic enhancement of the air grill.

An interior substantially V-shaped deflector barrier can be disposed directly behind the air intake grill with a center portion of the deflector barrier centered on the back of the air intake grill. The deflector barrier then extends rearwardly with opposite ends of the deflector barrier attached to the grill frame rearwardly of the air discharge grills.

An object of the present invention is to provide an aerodynamically enhanced air grill for a vehicle.

Another object of the invention, while achieving the before stated object, is to provide an aerodynamically enhanced air grill for a vehicle which substantially reduces air flow drag of a vehicle and thereby improves fuel mileage and vehicle stability.

Other objects, advantages and features of the present invention will become apparent from the following detailed description when read in conjunction with the drawings and appended claims.

DESCRIPTION

Figure 1:
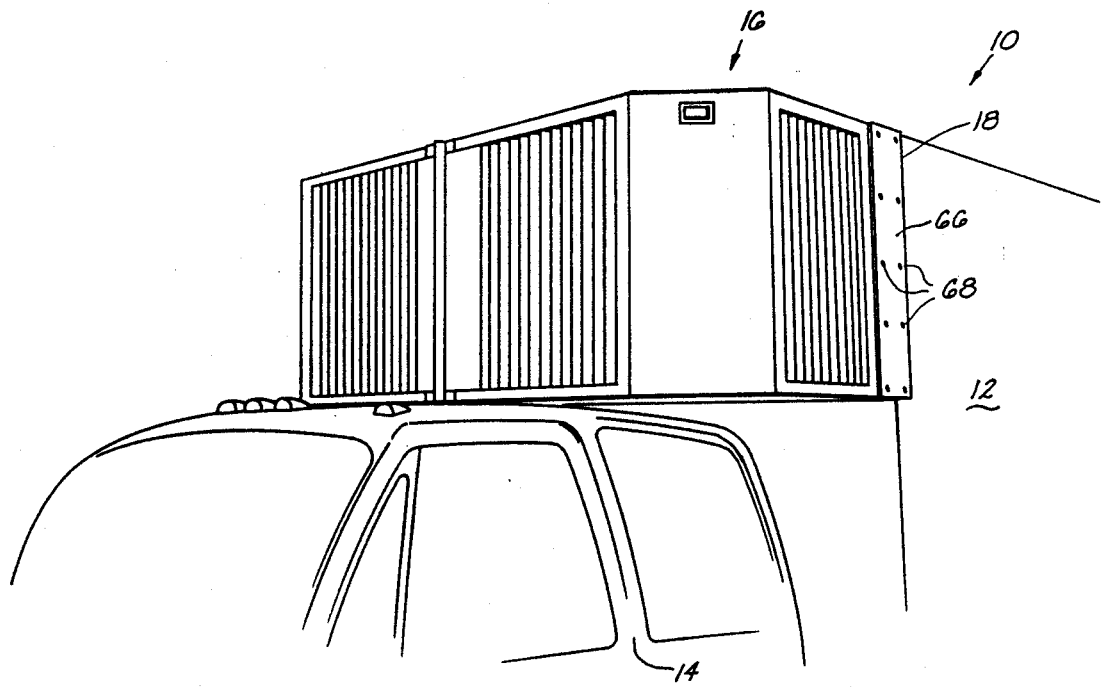
FIG. 1 is a partial pictorial view of a vehicle having a cab and trailer wherein an aerodynamically enhanced air grill constructed in accordance with the present invention is mounted on a forwardly extending upper portion of the trailer.

Referring now to the drawings, and more particularly to FIG. 1, shown therein is a partial view of a vehicle 10 having a van trailer or van body 12 (hereinafter referred to as trailer) and a cab 14. An aerodynamically enhanced air grill 16 of the present invention is attached to and supported by an upper forward portion 18 of the trailer 12 so as to be disposed above the cab 14 substantially as shown. It should be noted that the vehicle 10 can be any suitable type of pulling vehicle such as a pickup truck or the like; and the trailer 12 can be provided with a fifth wheel (not shown) for connecting the trailer 12 to the bed of the pulling vehicle. On the other hand, the vehicle 10 depicted in FIG. 1 can be a truck wherein the cab and van body are of unitary construction.

Figure 2:
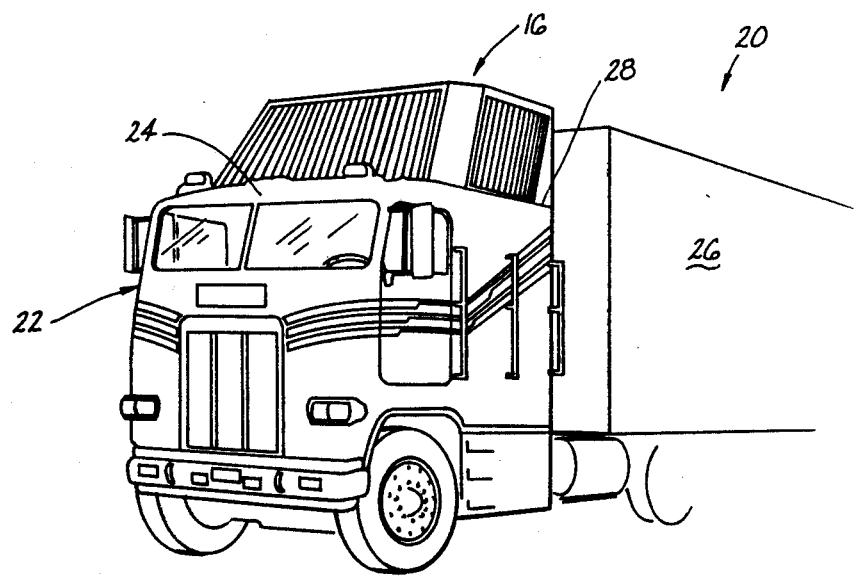
FIG. 2 is a partial pictorial view of a tractortrailer wherein the aerodynamically enhanced air grill is mounted on a cab of the tractor.

FIG. 2 is a partial view of a second type of vehicle 20, namely a tractor-trailer rig, having the aerodynamically enhanced air grill 16 mounted on a tractor 22 to improve fuel mileage, vehicle stability, and overall appearance of the vehicle 20. The vehicle 20 comprises the tractor 22 defining a cab 24 (the tractor 22 constituting the pulling vehicle) and a trailer 26. The aerodynamically enhanced air grill 16 is mounted on a forward upper portion of the vehicle 20, such as an upper supporting surface 28 of the cab 24 substantially as shown.

From the above, it becomes apparent that the term "vehicle" as used herein can be any suitable land-based vehicle having a cab and trailer (whether same constitutes individual units or a unitary unit), such as trucks having van bodies or other types of bodies which constitute the vehicle, or trucks and tractors adapted to pull trailers, such as van trailers, goose neck trailers and the like. Further, when referring to the forward upper portion of a trailer herein, it is to be understood that such terminology refers to the forward wall of the trailer disposed adjacent to and extending above the cab of the vehicle (when referring to vehicles, such as vehicle 10) or the upper supporting surface 28 of the cab 24 (when referring to other vehicles, such as the vehicle 20).

As previously stated, the aerodynamically enhanced air grill 16, because of its improved aerodynamic characteristics, provides improved stability of the vehicle (including the trailers 12 and 26) and improves the fuel mileage of the vehicle. Further, the configuration of the aerodynamically enhanced air grill 16 improves the overall appearance of the vehicle to which same is attached.

Figure 3:
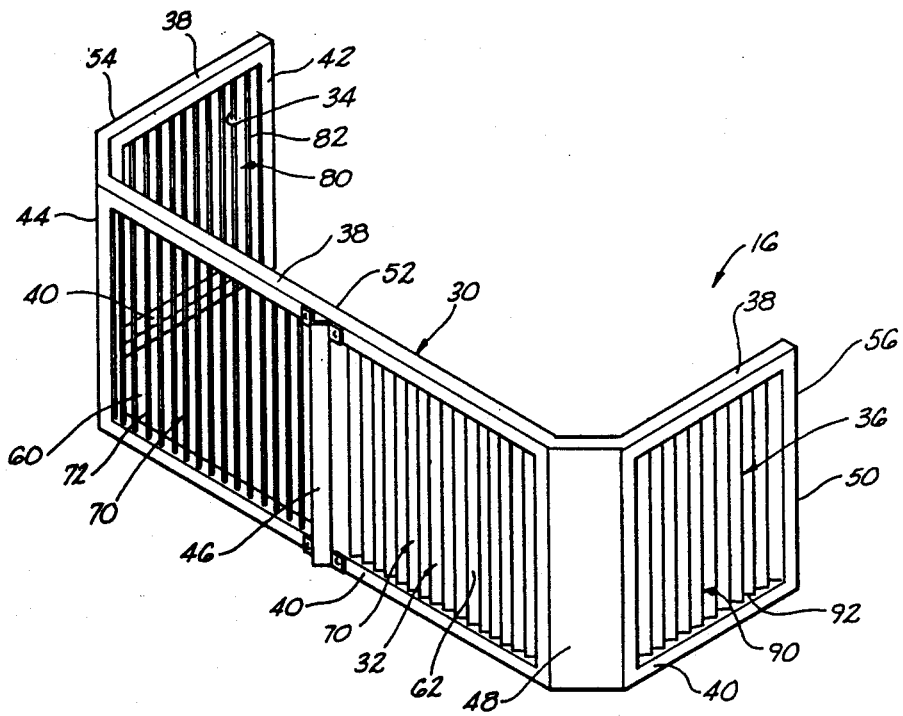
FIG. 3 is an isometric view of the aerodynamically enhanced air grill of the present invention.
Figure 4:
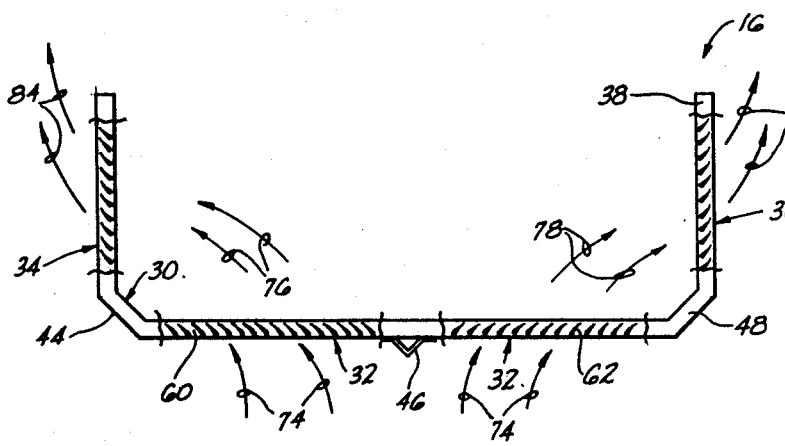
FIG. 4 is a partial sectional, top plan view of the aerodynamically enhanced air grill of FIG. 3.

Referring now to FIGS. 3 and 4, the aerodynamically enhanced air grill 16 is illustrated in more detail. The aerodynamically enhanced air grill 16 comprises a grill frame 30 for supporting at least one air intake grill 32 and a plurality of air discharge grills, such as a first air discharge grill 34 and a second air discharge grill 36. The grill frame 30 can be mounted on a vehicle, such as the vehicle 10 or the vehicle 20, in a conventional manner; or the grill frame 30 can be built into the vehicle as original equipment during the manufacture of the vehicle.

The grill frame 30 comprises an upper frame member 38, a substantially parallel, spatially disposed lower frame member 40 and a plurality of upright support members 42, 44, 46, 48 and 50 for interconnecting the upper frame member 38 and the lower frame member 40. Thus, the upper frame member 38 and the lower frame member 40 cooperate to define a forwardly disposed portion 52, a first side portion 54 and a spatially disposed second side portion 56; and the upright members 42-50 cooperate with the upper and lower frame members 38, 40 to define an opening in each of the forwardly extending portion 52 and the first and second side, portions 54, 56 such that the air intake grill 32 and the first and second air discharge grills 34, 36 can be supported in of such openings. That is, the air intake grill 32 is disposed within the opening in the forwardly disposed side portion 52 of the grill frame 30 defined by the upper and lower frame members 38, 40, and the upright support members 44, 46 and 48; the first air discharge grill 34 is disposed within the opening formed in the first side portion 54 of the grill frame 30 defined by the upper and lower frame members 38, 40 and the upright support members 42 and 44; and the second air discharge grill 36 is disposed within the opening formed in the second side portion 56 of the grill frame 30 defined by the upper and lower frame members 38, 40 and the upright support members 48 and 50.

The upper frame member 38 and the lower frame member 40, which cooperates to provide the grill frame 30 with a substantially U-shaped configuration, can be fabricated of unitary construction, or the upper and lower frame members 38, 40 can be fabricated of segments which are interconnected in a conventional manner. The upright members 42-50, in addition to interconnecting the upper and lower frame members 38 and 40 and cooperating with such members to define the openings in the grill frame 30, are constructed and designed so that the aerodynamic properties of the air grill 16 are substantially enhanced by reducing the air friction or drag encountered by the vehicle when the vehicle is in the travelling mode. That is, the upright support member 44 (which serves as a first corner member for interconnecting the upper and lower frame members 38, 40 forming the first side portion 54 of the grill frame 30 to the upper frame members 38, 40 forming the forwardly disposed portion 52 of the grill frame 30), is constructed to provide a rearwardly extending angle between the forwardly disposed portion 52 and the first side portion 54 of the grill frame 30 so that air impacting on the upright support member 44 is directed rearwardly along the first side portion 54 of the grill frame 30 and thus around the corresponding first side portion of the trailer.

Similarly, the upright support member 48 (which serves as a second corner member for interconnecting the upper and lower frame members 38, 40 forming the second side portion 56 of the grill frame 30 to the upper frame members 38, 40 defining the forwardly disposed portion 52 of the grill frame 30), is constructed to provide a rearwardly extending angle between the forwardly disposed portion 52 and the second side portion 56 of the grill frame 30 so that air impacting on the upright support member 48 is directed rearwardly along the second side portion 56 of the grill frame 30 and thus the corresponding second side portion of the trailer.

The upright support member 46, which is centered in the forwardly disposed portion of the grill frame 30 serves not only as a reinforcing element and as a support member for defining one end of two openings in the forward portion thereof, but also serves to assist in enhancing the direction of impacting air on the forwardly disposed portion 32 of the grill 30 into a first section 60 (i.e. the left section) or a right second section 62 (i.e. the right section) of the air intake grill 32. When the aerodynamically enhanced air grill 16 comprises a substantially V-shaped barrier member 64 (see FIG. 5), the upright support member 46 also functions as a connecting member for the barrier member 64.

The upright support members 42 and 50, (which interconnect the distal ends of the upper and lower frame members 38, 40, forming the first and second side portions 54, 56 of the grill frame 30), further function as support members for connector plates, such as connector plate 66, employed to secure the distal ends of the side portions of the grill frame 30 to the upper forward portion of the trailer, such as the upper forward portion 18 of the trailer 12 as shown in FIG. 1. It should be noted that only one of the connector plates, namely connector plate 66 is shown. However, an identical connector plate is utilized to secure the first side portion 54 of the grill frame 30 to the upper forward portion 18 of the trailer 12.

As shown in FIG. 1, the connector plate 66 is disposed between the distal end of the second side portion 56 of the grill frame 30 and the trailer 12 so that an outwardly flared surface is provided along the connector plate 66. Thus, air impacting upon the connector plates, such as the connector plate 66, is directed outwardly and around the adjacent side portion of the trailer 12 and thereby reduces friction or drag which might result from air impacting upon a substantially flat, perpendicular surface of the trailer Any suitable means can be employed for securing the connector plates, such as the connector plate 66, to the distal ends of the first and second side portions 54, 56 of the grill frame 30 and the upper forward portion 18 of the trailer 12. For example, the connector plates (such as connector plate 66) can be bolted to the adjacently disposed upright support member (such as the upright support member 50), and the upward forward portion 18 of the trailer 12 by a plurality of bolts 68 substantially as shown in FIG. 1.

As can be appreciated, when mounting the aerodynamically enhanced air grill 16 on the upper supporting surface 28 of the cab 24 (as shown in FIG. 2), the connector plates 66 are not required. In order to secure the aerodynamically enhanced air grill 16 to the cab 24, any suitable means can be employed, such as by bolting the lower frame member 40 to the upper supporting surface 28 of the cab 24. Such methods for connecting a grill frame 30 to the upper supporting surface 28 of a cab 24 are well known. Thus, no further comments are believed necessary to enable one skilled in the art to fully understand and appreciate the connection of the aerodynamically enhanced air grill 16 to either the upper supporting surface 28 of the cab 24, or to the upper forward portion 18 of the trailer 12.

The air intake grill 32, which is mounted in the openings formed in the forwardly disposed portion 52 of the grill frame 30, comprises an array of substantially vertically, spatially disposed first air foils 70 having an air space 72 formed between each of the air foils 70. Air impacting the air intake grill 16 (and represented by the arrows 74) is passed through the air spaces 72 and directed toward either the first air discharge grill 34 (as indicated by the arrows 76) or the second air discharge grill 36 (as indicated by the arrows 78). That is, the portion of the air foils forming first section 60 of the air intake grill 32 (i.e. the left portion) deflect the air passing through the air spaces 72 toward the first air discharge grill 34; and the air foils constituting the second section 62 of the air intake grill 32 deflect the air passing therethrough to the second air discharge grill 36.

The first air discharge grill 34, which is mounted in the opening formed in the first side portion 54 of the grill frame 30, comprises an array of substantially vertically, spatially disposed second air foils 80 having an air space 82 formed between each of the second air foils 80. Air passing through the first section 60 of the air intake grill 32 (and represented by the arrows 76) can be received and passed through the air spaces 82 formed between the second air foils 80. Thus, the air passing through the air spaces 82 of the array of second air foils 80 is directed rearwardly around the trailer of the vehicle, such as the trailer 12 (FIG. 1) or the trailer 26 (FIG. 2) as indicated by the arrows 84.

Similarly, the second air discharge grill 36, which is mounted in the opening formed in the second side portion 56 of the grill frame 30, comprises an array of substantially vertical, spatially disposed third air foils 90 having an air space 92 formed between each of the third air foils 90. Air passing through the second section 62 of the air intake grill 32 (and represented by the arrows 78) can be received and passed through the air spaces 92 formed between the third air foils 90. Thus, the air passing through the air spaces 92 of the array of third air foils 90 is directed rearwardly around the trailer of the vehicle, such as the trailer 12 (FIG. 1) or the trailer 26 (FIG. 2) as indicated by the arrows 94.

It will be appreciated that the array of first, second and third air foils 70, 80 and 90 can be secured to the grill frame 30 such that the air foils are in a fixed, stationary position; or at least a portion of the air foils can be pivotally connected to the grill frame 30 so that the air foils can be pivotally moved to selectively alter the direction of air flow passing therethrough, or to be actuated in response to impacting air. It should also be noted that when providing the air intake grill 32 with the first and second sections 60, 62, that the air flow impacting the air intake grill 32 is split into two streams. That is, the air flow is split such that one-half thereof engages the first section 60 and the other half engages the second section 62. Thus, the air flow passing through the air intake grill 32 is divided equally between the first air discharge grill 34 and the second air discharge grill 36.

Figure 6:
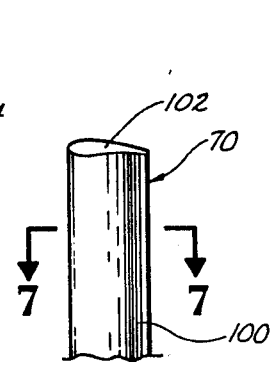
FIG. 6 is a fragmentary, isometric view of an air foil constituting an array of air foils for selectively directing air through the air grill.
Figure 7:
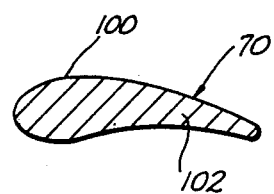
FIG. 7 is a sectional view of the air foil taken along lines 7 - 7 of FIG. 6.

The first air foils 70 constituting the array of air foils of the air intake grill 32 are identical in construction to the air foils 80 and 90 constituting the array of air foils of the first and second air discharge grills 34 and 36. Thus, only one of the first air foils 70 will be described in detail with reference to FIGS. 6 and 7. As can be seen, the first air foil 70 is an elongated member 100 having a cross sectional configuration 102 corresponding to an air foil section (see FIG. 7). The unique configuration of the first air foil 70 functions to selectively direct air flow passing through the air intake grill 32 (and thus through the first and second air discharge grills 34 and 36), and substantially reduces any drag which might result from frictional engagement of the air passing therethrough. Thus, the unique design and disposition of the array of air foils employed in the air intake grill 32, as well as the first and second air discharge grills 34 and 36, provide an aerodynamically enhanced air grill which not only improves the stability of the vehicle, but also increases the fuel mileage and appearance of such vehicle.

Figure 5:
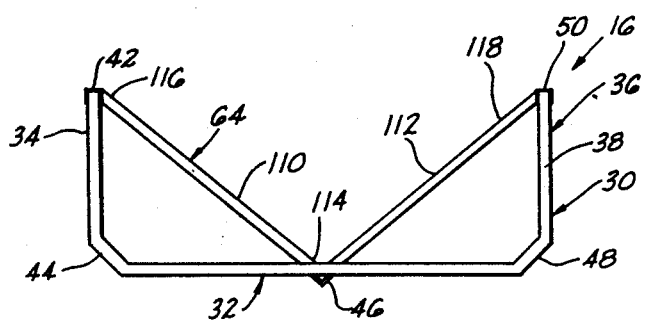
FIG. 5 is a top plan view of the aerodynamically enhanced air grill having a substantially V-shaped deflector barrier.

To enhance the air flow passing through the air intake grill 32 to the first and second air discharge grills 34, 36, the barrier member 64 can be disposed within the grill frame 30 substantially as shown in FIG. 5. The barrier member 64 is provided with a first barrier wall 110 and a second barrier wall 112. The barrier member 64, a substantially V-shaped member, has its center portion 114 juxtaposed against the back of the upright support member 46 (and thus the air intake grill 32); and the barrier member 64 extends from the upper frame member 38 to the lower frame member 40 of the grill frame 30. The first and second barrier walls 110 and 112 extend rearwardly forming the V-shape with an end portion 116 of the first barrier wall 110 attached to the upright support member 42 and an end portion 118 of the second barrier wall 112 attached to the upright support member 50 substantially as shown.

To insure that the air flow continues to be direct toward the first and second air discharge grills 34, 36, the first and second barrier walls 110 and 112 of the barrier member 64 are angled at approximately 45 degrees from the forwardly extending portion and opposed side portions of the grill frame 30. Thus, by providing the air intake grill 32 with the before described first and second sections 60, 62, in combination with the barrier member 64, the air flow is substantially evenly discharged out of the first and second air discharge grills 34, 36, thereby providing greater stability to the vehicle and reducing the likelihood of fishtailing by a trailer connected to the vehicle, such as the trailer 26 (FIG. 2), as it is pulled behind a vehicle, such as the vehicle 20.

From the above description, it becomes apparent that the air grill 16 is provided with aerodynamically enhanced properties which have not been available with the prior art devices. Further, it is clear that the present invention is well adapted to carry out the objects and attain the ends and advantages mentioned as well as those inherent therein. While presently preferred embodiments of the invention have been described for purposes of this disclosure, it will be understood that numerous changes may be made which will readily suggest themselves to those skilled in the art and which are encompassed within the spirit of the invention disclosed and as defined in the appended claims.

What is claimed is:

1. An aerodynamically enhanced air grill mountable on an upper, forward portion of a vehicle comprising:
    a grill frame mounted on an upper, forwardly disposed portion of the vehicle, the grill frame having a forwardly disposed portion, a first side portion and a spatially disposed second side portion, the grill frame defining therein at least one opening in each of the forwardly disposed portion, the first side portion and the second side portion;
    an air intake grill mounted in the opening formed in the forwardly disposed portion of the grill frame, the air intake grill comprising an array of substantially vertically, spatially disposed first air foils for directing air flow toward the openings in the first and second side portions of the grill frame when air impacting the air intake grill is received therethrough;
    a first air discharge grill mounted in the opening formed in the first side portion of the grill frame, the first air discharge grill comprising an array of substantially vertically, spatially disposed second air foils adapted to deflect air passing therethrough rearwardly around an adjacently disposed first side of the vehicle; and
    a second air discharge grill mounted in the second opening formed in the second side portion of the grill frame, the second air discharge grill comprising an array of substantially vertically, spatially disposed third air foils adapted to deflect air passing therethrough rearwardly around an adjacently disposed second side of the vehicle.

2. The aerodynamically enhanced air grill of claim 1 wherein a first portion of the first array of air foils is angularly disposed to direct air toward the first air discharge grill and wherein a second portion of the first array of air foils is angularly disposed to direct air toward the second air discharge grill such that substantially half of the air flow is directed toward each of the first and second air discharge grills for passage therethrough via the second and third array of air foils, respectively.

3. The aerodynamically enhanced air grill of claim 2 further comprising an interiorly disposed substantially V-shaped deflector barrier means centered at the back of the forwardly disposed portion of the frame support for enhancing the deflection of air flow passing through the air intake grill to the first and second air discharge grills.

4. The aerodynamically enhanced air grill of claim 3 wherein the V-shaped barrier means comprises:
    a first barrier wall having a first end and an opposed second end; and
    a second barrier wall having a first end and an opposed second end, the first end of the first barrier wall disposed rearwardly to the first air discharge grill and the first end of the second barrier wall disposed rearwardly to the second air discharge grill, the first and second barrier walls angled toward each other and joined to each other at their respective second ends to form a center portion at the back of the air intake grill and substantially centered thereon.

5. The aerodynamically enhanced air grill of claim 4 wherein the array of air foils constituting the air intake grill, the first air discharge grill and the second air discharge grill are each provided with a cross sectional configuration substantially corresponding to an air foil section.

6. The aerodynamically enhanced air grill of claim 5 wherein the grill frame further comprises:
first corner means for interconnecting one end of the first side portion to an adjacent end of the forwardly disposed portion, the first corner means defining a rearwardly extending angle between the forwardly disposed portion and the first side portion; and
second corner means for interconnecting one end of the second side portion to an adjacent end of the forwardly disposed portion, the second corner means defining a rearwardly extending angle between the forwardly disposed portion and the second side portion.

7. The aerodynamically enhanced air grill of claim 6 wherein the vehicle is characterized as having a cab and a trailer, the first and second side portions of the grill frame are each provided with a distal end, and wherein the air grill further comprises:
means for connecting the distal ends of the first and second side portions of the grill frame to a forward side of the trailer.

8. The aerodynamically enhanced air grill of claim 6 wherein the vehicle is characterized as having a cab and a trailer, and wherein the air grill further comprises:
means for connecting the grill frame to the cab of the vehicle.

9. The aerodynamically enhanced air grill of claim 6 wherein the array of air foils constituting the air intake grill, the first air discharge grill, and the second air discharge grill, are secured within their respective openings in a stationary position.

10. An aerodynamically enhanced air grill for a vehicle comprising:
a grill frame mounted on an upper, forwardly disposed portion of a vehicle, the grill frame having a forwardly disposed portion, a first side portion and a spatially disposed second side portion;
an air intake grill mounted in the forwardly disposed portion of the grill frame, the air intake grill comprising an array of substantially vertically, spatially disposed first air foils defining an air space therebetween for directing air flow toward the first and second side portions of the grill frame when air impacting the air intake grill is received therethrough;
a first air discharge grill mounted in the first side portion of the grill frame, the first air discharge grill comprising an array of substantially vertically, spatially disposed second air foils defining an air space therebetween for directing air flow rearwardly around an adjacent side of the vehicle; and
a second air discharge grill mounted in the second side portion of the grill frame, the second air discharge grill comprising an array of substantially vertically, spatially disposed third air foils defining an air space therebetween for directing air flow rearwardly around an adjacent second side of the vehicle, the air foils constituting the array of the first, second and third air foils each having a cross-sectional configuration substantially corresponding to an air foil section.

11. The aerodynamically enhanced air grill of claim 10 wherein the grill frame further comprises:
first corner means for interconnecting one end of the first side portion of the grill frame to an adjacent end of the forwardly disposed portion thereof, the first corner means defining a rearwardly extending angle between the forwardly disposed portion and the first side portion of the grill frame; and
second corner means for interconnecting one end of the second side portion of the grill frame to an adjacent end of the forwardly disposed portion thereof, the second corner means defining a rearwardly extending angle between the forwardly disposed portion and the second side portion of the grill frame.

12. The aerodynamically enhanced air grill of claim 11 wherein the vehicle is characterized as having a cab and a trailer, the first and second side portions of the grill frame are each provided with a distal end, and wherein the air grill further comprises:
means for connecting the distal ends of the first and second side portions of the grill frame to a forward side of the trailer.

13. The aerodynamically enhanced air grill of claim 12 wherein a first portion of the first array of air foils is angularly disposed to direct air toward the first air discharge grill and wherein a second portion of the first array of air foils is angularly disposed to direct air toward the second air discharge grill such that substantially half of the air flow is directed toward each of the first and second air discharge grills for passage therethrough via the second and third array of air foils, respectively.

14. The aerodynamically enhanced air grill of claim 11 wherein the vehicle is characterized as having a cab and a trailer, and wherein the air grill further comprises:
means for connecting the grill frame to the cab of the vehicle.

15. The aerodynamically enhanced air grill of claim 14 wherein a first portion of the first array of air foils is angularly disposed to direct air toward the first air discharge grill and wherein a second portion of the first array of air foils is angularly disposed to direct air toward the second air discharge grill such that substantially half of the air flow is directed toward each of the first and second air discharge grills for passage therethrough via the second and third array of air foils, respectively.

16. The aerodynamically enhance air grill of claim 10 wherein the air intake grill is provided with a first section and a second section, the array of first air foils being disposed in the first section such that half of the air impacting the air intake grill is directed toward the first air discharge grill, the array of first air foils being disposed in the second section such that half of the air impacting the air intake grill is directed toward the second air discharge grill.

17. The aerodynamically enhanced air grill of claim 16 further comprising an interiorly disposed substantially V-shaped deflector barrier means centered between the first and second sections of the air intake grill for enhancing the deflection of air flow passing through the air intake grill to the first and second air discharge grills.

18. The aerodynamically enhanced air grill of claim 17 wherein the V-shaped barrier means comprises:
a first barrier wall having a first end and an opposed second end; and
a second barrier wall having a first end and an opposed second end, the first end of the first barrier wall disposed rearwardly to the first air discharge grill and the first end of the second barrier wall disposed rearwardly to the second air discharge grill, the first and second barrier walls angled toward each other and joined to each other at their respective second ends to form a center portion at the back of the air intake grill at a position between the first and second side portions of the air intake grill.

* * * * *

UNITED STATES PATENT AND TRADEMARK OFFICE
CERTIFICATE OF CORRECTION

PATENT NO. : 4,957,325

DATED : September 18, 1990

INVENTOR(S) : Thomas H. Engel

It is certified that error appears in the above-identified patent and that said Letters Patent is hereby corrected as shown below:

Title Page: - [63] Related U.S. Application Data, delete "4,840,442" and substitute therefor --4,840,422--;

Title Page: - [56] References Cited, Foreign Patent Documents, insert --724062   no date   France ......-- as a reference;

Column 1, line 10, delete "4,840,442" and substitute therefor --4,840,422--; and Column 3, line 15, delete "tractortrailer" and substitute therefor --tractor-trailer--.

Signed and Sealed this

Thirtieth Day of June, 1992

Attest:

DOUGLAS B. COMER

*Attesting Officer*     *Acting Commissioner of Patents and Trademarks*